April 11, 1939.  J. WALDMAN  2,154,224
CHAIN
Filed Aug. 17, 1938
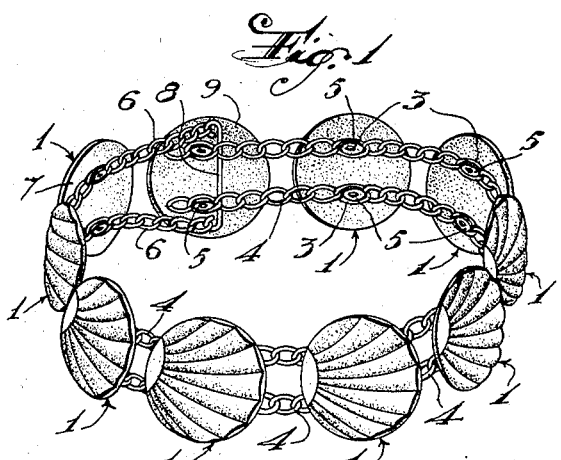
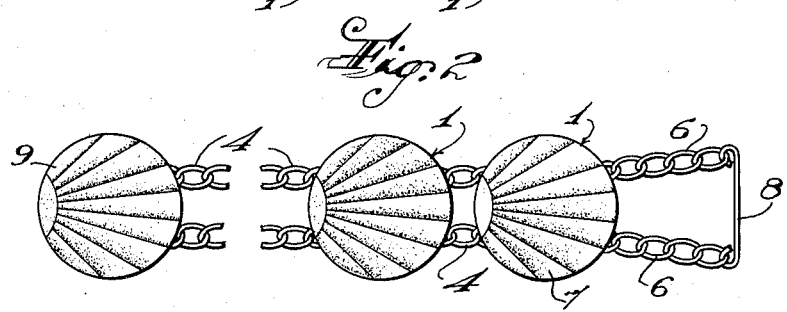
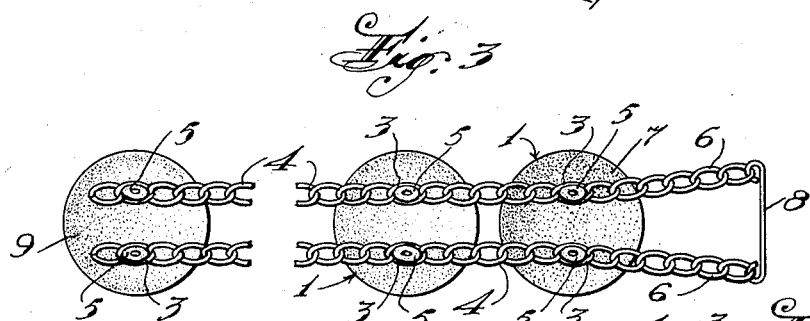
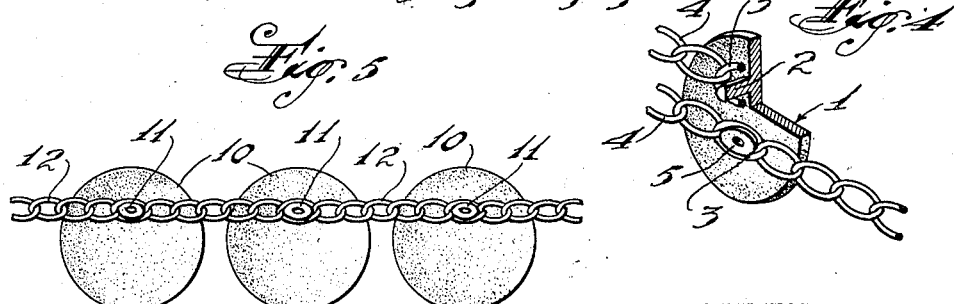
INVENTOR
Joseph Waldman
BY Ivan O. Fischer
ATTORNEY Patented Apr. 11, 1939

2,154,224

UNITED STATES PATENT OFFICE 2,154,224

CHAIN

Joseph Waldman, Irvington, N. J.

Application August 17, 1938, Serial No. 225,295

8 Claims. (Cl. 59—80)

This invention relates to improvements in chains; and more particularly to the provision of means for securely connecting a plurality of plates or ornamental elements together in a simple manner to impart flexibility and durability.

A chain of the type herein described is adapted for use as a flexible bracelet, neck band, belt, girdle or for other similar purposes.

Heretofore, chains of the type herein considered have been made by attaching link chains to the backs or ends of a plurality of plates by means of solder. This method of making a chain is objectionable in that the solder does not positively hold the link chains to the plates permanently, especially when the chain is frequently used; and also the soldering operation requires an appreciable amount of time and labor, thus materially increasing the cost of manufacture.

It is therefore an object of this invention to provide a chain in which link chains are secured permanently to a plurality of plates in a simple and convenient manner. In accordance with the invention, the link chains are riveted permanently to the plates by upsetting pins projecting integrally from the backs of the plate.

A further object is the provision of a chain having means for connecting the ends thereof together so that a continuous band of uniform appearance is produced, and the means of connection are not visible.

A further object is the provision of a chain having a plurality of connected plates which can be readily adjusted to any length simply by removing a desired number of plates without necessitating any change or manipulation of the means for connecting the ends of the chain together.

A further object is the provision of a chain formed by connecting a plurality of plates by means of a single link chain attached to the backs of the plates and adjacent one end thereof, thus providing a chain which can be used as a necklace, for example, and in other positions where it is desired that the chain hang in an arc.

These and other advantageous objects, which will later appear, are accomplished by the simple and practical construction and arrangement of parts hereinafter described and exhibited in the accompanying drawing, forming part hereof, and in which:

Fig. 1 is a perspective view of a chain made in accordance with the invention,

Fig. 2 is a plan view showing the front face of a chain made in accordance with the invention, Fig. 3 is a plan view of the back of the chain, Fig. 4 is a perspective view, partly in section, of the back face of a plate, showing the manner in which a link is attached to a plate, and Fig. 5 is a plan view of a chain having a single link chain attached to a plurality of plates to provide a chain which can be used as a necklace and the like.

Referring to the drawing, in Fig. 1, the chain is shown to comprise a plurality of plates 1, having projecting integrally from the rear faces thereof a pair of spaced pins 2, over which are positioned links 3 of the link chains 4.

The pins 2 are preferably oval or non-circular in cross-section, as shown in Fig. 4, so as to have substantially the shape of the links 3 thus preventing the rotation of the links 3 about the pins. After the links 3 have been positioned over the pins 2, the free ends of the pins are upset to provide heads 5, thus permanently securing the link chains to the plates 1. With this construction, it will be seen that the link chains can be quickly secured to the plates, the securing action requiring only the upsetting of the pins 2. The links cannot become detached from the plates through frequent and rough use.

The link chains 3 serve no ornamental purpose and are provided solely as a means for flexibly connecting the plurality of plates 1. The pins 2 are spaced inwardly from the edges of the plates so that when the chain is in use, points of connection of the link chains to the plates are entirely concealed.

At one end of the chain, the link chains 4 have portions 6 extending beyond the last plate 7 and the free ends of the portions 6 are secured to each other by a thin wire 8, providing a loop of sufficient size to pass over the plate 9 at the other end of the chain, thus providing a continuous band of uniform appearance with the means of connection being entirely concealed (see Fig. 1). Should it be desired to shorten the chain, it is only necessary to remove the end plate 9 by cutting the chain at the adjacent plate. No adjustments or alterations of the connecting loop formed by portion 6 and the wire 8 are necessary. The shortened chain can then have its ends connected to form a continuous band as above described.

From the above description it will be seen that there has been provided a chain which can be readily and inexpensively manufactured. The chain is obviously of durable construction as the link chains 4 are permanently secured to the plates 1. The plate 1 may be of any desired shape or ornamentation. Chains of the type herein described can be used for wrist bands, bracelets, belts, and the like.

In Fig. 5 is shown a plurality of plates 10, each plate having a single integral pin 11 projecting from the rear face thereof, the pin 11 being eccentrically arranged and spaced from one edge of the plate. The link chain 12 is secured to the plate 10 in the manner above described in connection with Figs. 1 to 4. A chain of the construction shown in Fig. 5 can be used as a necklace or the like, as the single link chain 12 connected to the ends of the plates 10 enables the plates to fall naturally by gravity in order to provide a pleasing arc such as desired in connection with necklaces.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In an ornamental chain, a plurality of plates, each of said plates having a pair of integral pins projecting from the rear face thereof, said pins being spaced from each other and spaced from opposite edges of the plate, and a pair of link chains having links positioned over said pins, the ends of said pins being upset over said links to provide heads to permanently secure the link chains to the plates.

2. In an ornamental chain, a plate having a pair of integral pins projecting from one face thereof, said pins being oval in cross-section and spaced from opposite edges of the plate and from each other, and a pair of link chains having oval links positioned over said pins, the free ends of said pins being upset to provide heads to permanently secure the link chains to the plates.

3. In an ornamental chain, a plate having an eccentrically arranged integral pin projecting from one face thereof and spaced from the edge thereof, a link chain having a link positioned over said pin, the free end of said pin being upset to provide a head to permanently secure the link to the plate.

4. In an ornamental chain, a plate having an eccentrically arranged integral pin projecting from one face thereof and spaced from the edge thereof, said pin being non-circular in cross-section, and a link chain having a link positioned over said pin, said link being non-circular, the free end of said pin being upset to permanently secure the link to the plate.

5. In a chain, a plurality of plates, a pair of link chains permanently secured to one face of said plates, said link chains having portions extending beyond the plate at one end of the chain, and means for connecting said extending portions of the link chains to provide a loop of sufficient size to pass over the plate at the other end of the chain.

6. In a chain, a plurality of plates, a pair of link chains permanently secured to one face of said plates, said link chains having portions extending beyond the plate at one end of the chain, and a thin wire connecting the extending portions of said link chains to provide a loop of sufficient size to pass over the plate at the other end of the chain.

7. In a chain, a plurality of plates having integral pins projecting from the rear faces thereof, and link chains having links positioned over said pins, the free ends of said pins being upset to provide heads to permanently secure said link chains to said plates, said link chains having portions extending beyond the plate at one end of the chain, means for connecting said extending portions of the link chains to provide a loop of sufficient size to pass over the plate at the other end of the chain.

8. In a chain, a plurality of plates, each of said plates having a pair of integral pins projecting from the rear face thereof, said pins being spaced from each other and spaced from the edges of the plate, and a pair of link chains having links positioned over said pins, the ends of said pins being upset over said links to provide heads to permanently secure the link chains to the plates, said link chains having portions extending beyond the plate at one end of the chain, means for connecting said extending portions of the link chains to provide a loop of sufficient size to pass over the plate at the other end of the chain.

JOSEPH WALDMAN.